US007321174B2

(12) United States Patent
Jones et al.

(10) Patent No.: US 7,321,174 B2
(45) Date of Patent: Jan. 22, 2008

(54) APPARATUS, SYSTEM, AND METHOD FOR MAXIMIZING POWER SYSTEM HOLDUP TIME DURING LOSS OF INPUT POWER

(75) Inventors: Carl Evan Jones, Tucson, AZ (US); Robert Akira Kubo, Tucson, AZ (US); Gregg Steven Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 11/030,461

(22) Filed: Jan. 6, 2005

(65) Prior Publication Data

US 2006/0146461 A1    Jul. 6, 2006

(51) Int. Cl.
*H02J 7/00* (2006.01)
*H02J 9/00* (2006.01)
(52) U.S. Cl. ..................................... 307/66
(58) Field of Classification Search ............... 307/66, 307/48, 65
See application file for complete search history.

(56) References Cited

U.S. PATENT DOCUMENTS 5,761,084 A * 6/1998 Edwards ..................... 700/293
6,121,695 A * 9/2000 Loh ............................ 307/64

* cited by examiner

*Primary Examiner*—Michael Sherry
*Assistant Examiner*—Carlos Amaya
(74) *Attorney, Agent, or Firm*—Kunzler & McKenzie

(57) ABSTRACT

An apparatus, system, and method are disclosed for maximizing power system holdup time during loss of input power. An energy storage module is included to deliver energy from an output stage of a first power supply to a bus. A power loss module is included to detect loss of power transmitting capability from an input stage of the first power supply to the output stage of the first power supply. A set-point reduction module is included to reduce an output voltage of the first power supply in response to the power loss module detecting loss of power transmitting capability. An isolation module is included to prevent energy flow from the energy storage module to the bus when the output voltage of the first power supply is lower than a voltage on the bus sustained by a second power supply.

20 Claims, 6 Drawing Sheets

APPARATUS, SYSTEM, AND METHOD FOR MAXIMIZING POWER SYSTEM HOLDUP TIME DURING LOSS OF INPUT POWER

BACKGROUND OF THE INVENTION

1. Field of the Invention

This invention relates to holdup time provided by a power supply and more particularly relates to preserving energy in a power supply that has lost input power in order to maximize system holdup time.

2. Description of the Related Art

Computer systems use power supplies to convert power from one form to another. Other electronic systems use power supplies as well. Typically, a computer system requires that a power supply convert an alternating current ("AC") input voltage to a direct current ("DC") voltage that may be used for internal computer components. In other applications, a power supply converts an AC voltage to a DC voltage, and then back to an AC voltage.

FIG. 1 is a schematic diagram 100 of a computer 102 with two AC-to-DC power supplies, power supply 1 104 and power supply 2 106, connected to a bus 108. The diagram 100 shows typical components of a power supply in power supply 1 104. Typically, an input power 109 is applied and connects to a connection point. The connection point may be input terminals and is depicted here as AC input terminal 112. Typical input power voltages are 120 volts alternating current ("VAC") single phase, 208 VAC single phase, 208 VAC three phase, and 408 VAC three phase. Other voltages are typical in specialty and foreign power systems. The input power 109 may also be in the form of a DC voltage. DC input voltages are typical in systems such as telephone equipment. The AC input terminal 112 may also include other power conditioning components such as surge suppressors.

Typically a power supply converts a higher AC input voltage to a lower DC voltage. For example, a power supply in a personal computer may convert 120 VAC single phase to 12 VDC. Other output voltages are common such as 5 VDC or 3.3 VDC. Typically, a computer 102 will include a bus, or other distribution network, for each voltage used in the computer 102. A converter with an AC input and a DC output is typically called an AC-to-DC converter. A converter with a DC input and a DC output is typically called a DC-to-DC converter.

Power supply 1 104 may also include an electromagnetic interference ("EMI") filter 114. The EMI filter 114 filters out unwanted frequencies generated in the power supply 1 104 or traveling on the input power 109 connection. For AC systems, the power supply 1 104 includes some type of rectifier 116. For example, the rectifier 116 may be a half bridge or a full bridge rectifier constructed with diodes or components configured to be diodes. The rectifier 116 typically converts AC voltage to DC voltage. The rectifier 116 may include a capacitor after the diode components of the rectifier.

The power supply 1 104 may also include an inrush current limiter 118 to limit current when power is first applied to the power supply 1 104. A current limiter maybe a choke or other coupled magnetic element configured to limit current inrush.

The power supply 1 104 may also include a power factor correction ("PFC") booster 120. A power factor ("PF") control 122 circuit may also be included. The PFC booster 120 and PF control 122 are typically configured to compensate for low power factor generated by a power supply, such as power supply 1 104. The PFC booster 120 and PF control 122 may typically use active components and switching. The PFC booster 120 and PF control 122 are typically configured to create a current as seen at the AC input terminal 112 such that the power factor is high.

Note that many power supply configurations are possible and that many of the above mentioned elements may not be included in a power supply. For example, a DC-to-DC power supply may not include the rectifier 116. Less expensive power supplies or power supplies in non-sensitive environments may not include an EMI filter 114. While there is typically some means to connect the input power 109, the AC input terminal 112 may not include surge suppressors, terminals or other conditioning elements. Many power supplies are configured without power factor correction so the PFC booster 120 and PF control 122 may not be included. Inrush current may not be a problem due to natural impedances so an inrush current limiter 118 may not be included.

In situations where higher reliability is desired, multiple power supplies may be connected to a common bus. For example, power supply 1 104 connected to a bus 108 may derive input power 109 from one power system and power supply 2 106 also connected to the bus 108 may derive power from another power system. Such a system would have an increased reliability over a single power supply system because loss of power in one power system would only affect the power supply connected to the power system that lost power.

When a computer system loses power, data may be lost. One way to minimize data loss is to sense when power is about to be lost and then store pertinent data before the system actually loses power. The time between when a power loss is sensed and when voltage levels on a computer bus or a power supply feeding the bus drops to an unusable level is often called holdup time. Typically holdup time is on the order of hundreds of milliseconds. Batteries may be used in some applications to provide power when input power is lost. In many situations, however, batteries may not be able to provide power at full amperage as may be required to save critical data.

A power supply may be used to create a holdup time. A power supply may provide full power or near full power for a short period of time. Typically, a power supply includes one or more energy storage components such as a capacitor. If a minimum holdup time is required, a capacitor or capacitors in a power supply may be sized to store enough energy to maintain the computer bus above a minimum voltage level. A capacitor may be sized for holdup and may be larger than what may be required for normal converter operation in a power supply.

Power supply 1 104 includes a bulk capacitor 124 used for holdup time. The bulk capacitor 124 may comprise a capacitor bank. The bulk capacitor 124 may also be used for voltage and current smoothing of the rectified waveforms from the rectifier 116 or other components. Power supply 1 104 also includes a DC-to-DC converter 126 configured to convert the DC voltage at the bulk capacitor 124 to the voltage to be used on the bus 108. The DC-to-DC converter 126 is controlled typically with a feedback loop, here shown as a sense and control circuit 128, sensing the voltage on the bus 108 and comparing it to a reference voltage.

The voltage on the bulk capacitor 124 is typically higher than the voltage of the bus 108 so that some form of buck converter may be used to convert the higher bulk capacitor 124 voltage to the lower bus 108 voltage. Since a converter may have a wide input voltage range, if input power 109 is lost or some other component fails ahead of the bulk capacitor 124, the energy stored in the bulk capacitor 124 will temporarily allow the DC-to-DC converter 126 to continue to operate. The operation will continue until the voltage on the bulk capacitor 124 is reduced to a level where the DC-to-DC converter 126 can no longer sustain the bus 108 voltage. The time from when input power 109 loss is detected or a component failure stopping power transfer to the bulk capacitor 124 to a time when the bus 108 voltage drops below a minimum level is typically called holdup time. As the value of the bulk capacitor 124 is increased, the holdup time is increased.

If the output voltage of the power supply 1 104 drops below the voltage of the bus 108, current will flow to the power supply 1 104 which may drag down the voltage of the bus 108. Typically, when multiple power supplies 104, 106 are connected to a bus 108, the power supplies 104,106 are configured so that failure of a single power supply 1 104 will not affect the bus 108. One way to protect a common bus 108 is to use a diode function at the output of each power supply. Power supply 1 104 includes a power diode 130 which may be a diode or another electronic component, such as a metal-oxide semiconductor field-effect transistor ("MOSFET") configured to operate as a diode. Typically, the electronic component is connected between the DC-to-DC converter 126 output and the bus 108 and is configured to protect the bus 108 when the DC-to-DC converter 126 output voltage suddenly drops below the voltage of the bus 108. If power supply 1 104 loses power or a component ahead of the bulk capacitor 124 fails, the voltage of the DC-to-DC converter 126 will drop. As the output voltage drops, the electronic component configured as a diode (power diode 130) becomes reverse biased so that current will substantially not flow back into power supply 1 104 and will not drag down the bus 108 voltage. Once the diode configured component 130 is reverse biased, other power supplies 106 connected to the bus 108 maintain the bus voltage.

Currently, systems with more than one power supply 104,106 connected to a bus 108 allow a power supply 104 that can no longer deliver power to the bus 108 to deliver power until the output voltage drops low enough for the diode configured component (the power diode 130) connected to the bus 108 to be reverse biased. Once the energy stored in the failed power supply 1 104 is delivered to the bus 108, the energy is no longer available for holdup time. The remaining power supply 2 106 is left to provide the required holdup time. If the remaining power supply 2 106 fails in a way that it cannot provide power to the bus 108, such as the diode component of power supply 2 106 failing open, power supply 2 106 cannot fulfill the holdup requirement of the computer 102.

Power supply 1 104 and power supply 2 106 may each include an early power off warning (EPOW) control 132 or similar module. In current systems, the EPOW control 132 sends a signal to the computer 102 warning that power will be lost in the power supply 104, 106. EPOW control 132 in power supply 1 104 may communicate with power supply 2 106. In one embodiment, when power is lost in both power supply 1 104 and power supply 2 106, the computer 102 takes action to prevent data loss during any available holdup time. In currently available systems, when power supply 1 104 has lost input power 109 and power supply 2 106 becomes unable to deliver power to the bus 108, holdup time is unavailable to the computer 102.

From the foregoing discussion, it should be apparent that a need exists for an apparatus, system, and method to maximize power system holdup time. Beneficially, such an apparatus, system, and method would maintain energy for holdup time in a power supply that can no longer deliver power to a bus for use if another power supply is unable to provide holdup power. The apparatus, system and method would increase system reliability by providing redundant holdup time even after a power supply is unable to deliver power.

SUMMARY OF THE INVENTION

The present invention has been developed in response to the present state of the art, and in particular, in response to the problems and needs in the art that have not yet been fully solved by currently available redundant power supply systems configured to provide computer power system holdup time. Accordingly, the present invention has been developed to provide an apparatus, system, and method for maximizing power system holdup time during loss of input power that overcome many or all of the above-discussed shortcomings in the art.

The apparatus to maximize power system holdup time during loss of input power is provided with a logic unit containing a plurality of modules configured to functionally execute the necessary steps of detecting loss of power transmitting capacity of an input stage to an output stage of a power supply feeding a bus, reducing voltage of the output stage, and preventing energy flow from the bus to the power supply. These modules in the described embodiments include an energy storage module that delivers energy from an output stage of a first power supply to a bus. A power loss module is included that detects loss of power transmitting capability from an input stage of the first power supply to the output stage of the first power supply. A set-point reduction module is included that reduces an output voltage of the first power supply in response to the power loss module detecting loss of power transmitting capability. An isolation module is included that prevents energy flow from the energy storage module to the bus when the output voltage of the first power supply is lower than a voltage on the bus sustained by a second power supply.

The apparatus, in one embodiment, includes an energy maintenance module that transfers energy from the bus to the energy storage module sufficient to maintain energy in the energy storage module in response to the power loss module detecting loss of power transmitting capability. In another embodiment, the apparatus includes an energy maintenance module that transfers energy from the second power supply to the energy storage module sufficient to maintain energy in the energy storage module in response to the power loss module detecting loss of power transmitting capability.

In one embodiment, the power loss module detects loss of input power to the input stage of the first power supply. In another embodiment, the power loss module detects a component failure in the first power supply causing loss of power transmitting capability from the input stage to the output stage. In another embodiment, the energy storage module comprises a capacitor. In yet another embodiment, the isolation module comprises an electronic device configured as a diode. In a further embodiment, the electronic device comprises a MOSFET. In an alternate embodiment, the set-point reduction module comprises a current sharing circuit that controls current sharing between the first power supply and the second power supply.

A system of the present invention is also presented for maximizing power system holdup time during loss of input power. The system may be embodied by a bus and a first power supply connected to the bus. The first power supply includes an energy storage module that delivers energy from an output stage of the first power supply to the bus. The first power supply includes a power loss module that detects loss of power transmitting capability from an input stage of the first power supply to the output stage of the first power supply. The first power supply includes a set-point reduction module that reduces an output voltage of the first power supply in response to the power loss module detecting loss of power transmitting capability. The first power supply also includes an isolation module that prevents energy flow from the energy storage module to the bus when the output voltage of the first power supply is lower than a voltage on the bus. The system also includes a second power supply connected to the bus configured to sustain the voltage on the bus when the isolation module prevents energy flow from the energy storage module to the bus.

In particular, the system, in one embodiment, includes an energy maintenance module that transfers energy from the second power supply to the energy storage module sufficient to maintain energy in the energy storage module in response to the power loss module detecting loss of power transmitting capability. In an alternate embodiment, the system includes an energy maintenance module that transfers energy from the bus to the energy storage module sufficient to maintain energy in the energy storage module in response to the power loss module detecting loss of power transmitting capability.

In one embodiment, the energy storage module comprises a capacitor. In another embodiment, the isolation module comprises an electronic device configured as a diode. In a further embodiment, the electronic device comprises a MOSFET.

An apparatus of the present invention is also presented for maximizing power system holdup time during loss of input power. The apparatus in the disclosed embodiments substantially includes the means necessary to carry out the functions presented above with respect to the operation of the described apparatus and system. In one embodiment, the apparatus includes means for delivering energy from an output stage of a first power supply to a bus. The apparatus includes means for detecting loss of power transmitting capability from an input stage of the first power supply to the output stage of the first power supply. The apparatus includes means for reducing an output voltage of the first power supply in response to detecting loss of power transmitting capability. The apparatus also includes means for preventing energy flow from the output stage of the first power supply to the bus when the output voltage of the first power supply is lower than a voltage on the bus sustained by a second power supply.

In a further embodiment, the apparatus includes means for transferring energy from the bus to the first power supply sufficient to maintain energy in the first power supply in response to detecting loss of power transmitting capability. In another embodiment, the apparatus includes means for transferring energy from the second power supply to the first power supply sufficient to maintain energy in the first power supply in response to detecting loss of power transmitting capability.

In one embodiment, means for detecting loss of power transmitting capability further includes means for detecting loss of input power to the input stage of the first power supply. In another embodiment, means for detecting loss of power transmitting capability further comprises means for detecting a component failure in the first power supply that causes loss of power transmitting capability from the input stage to the output stage.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
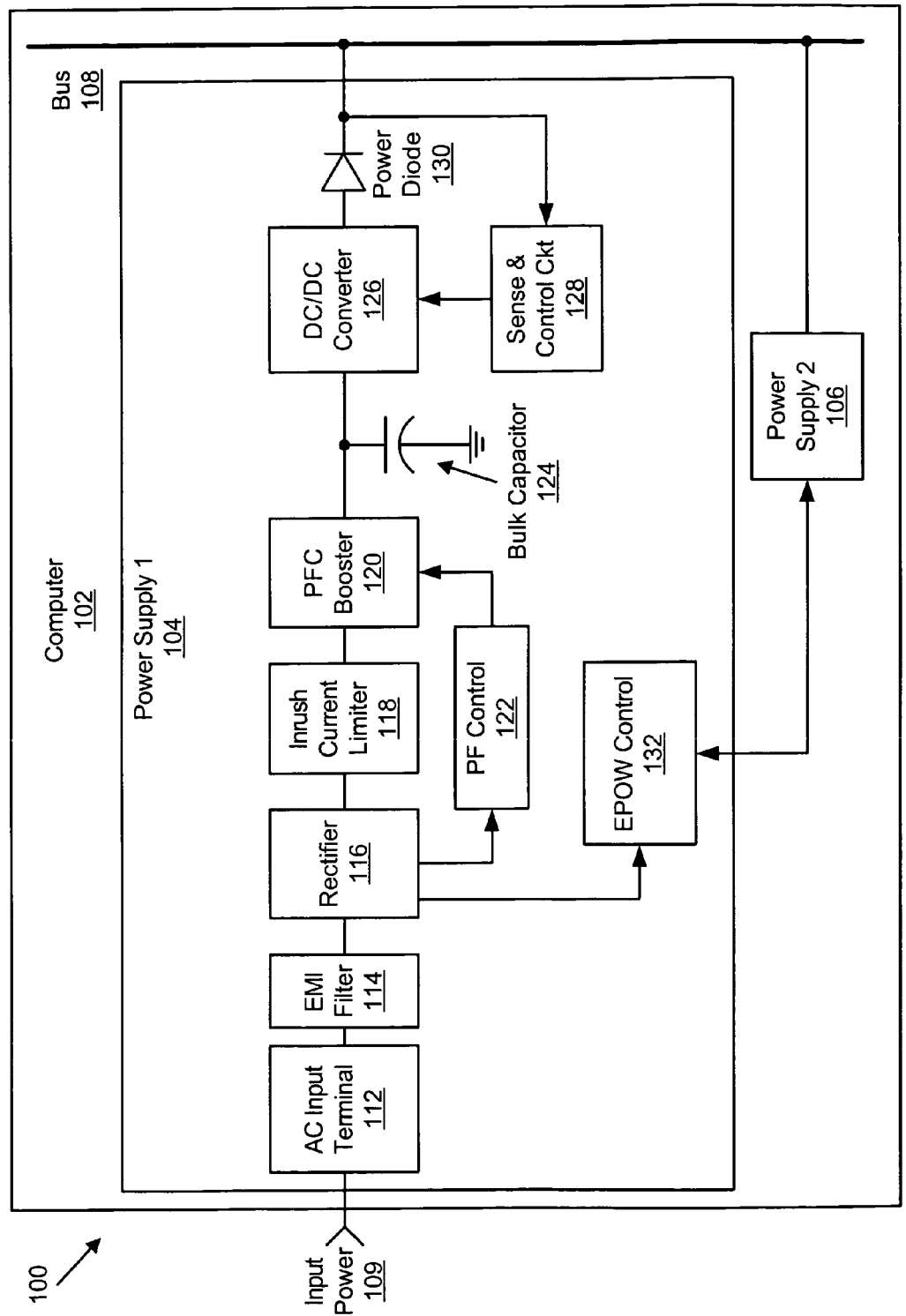
FIG. 1 is a schematic diagram of a computer with two AC-to-DC power supplies connected to a bus.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
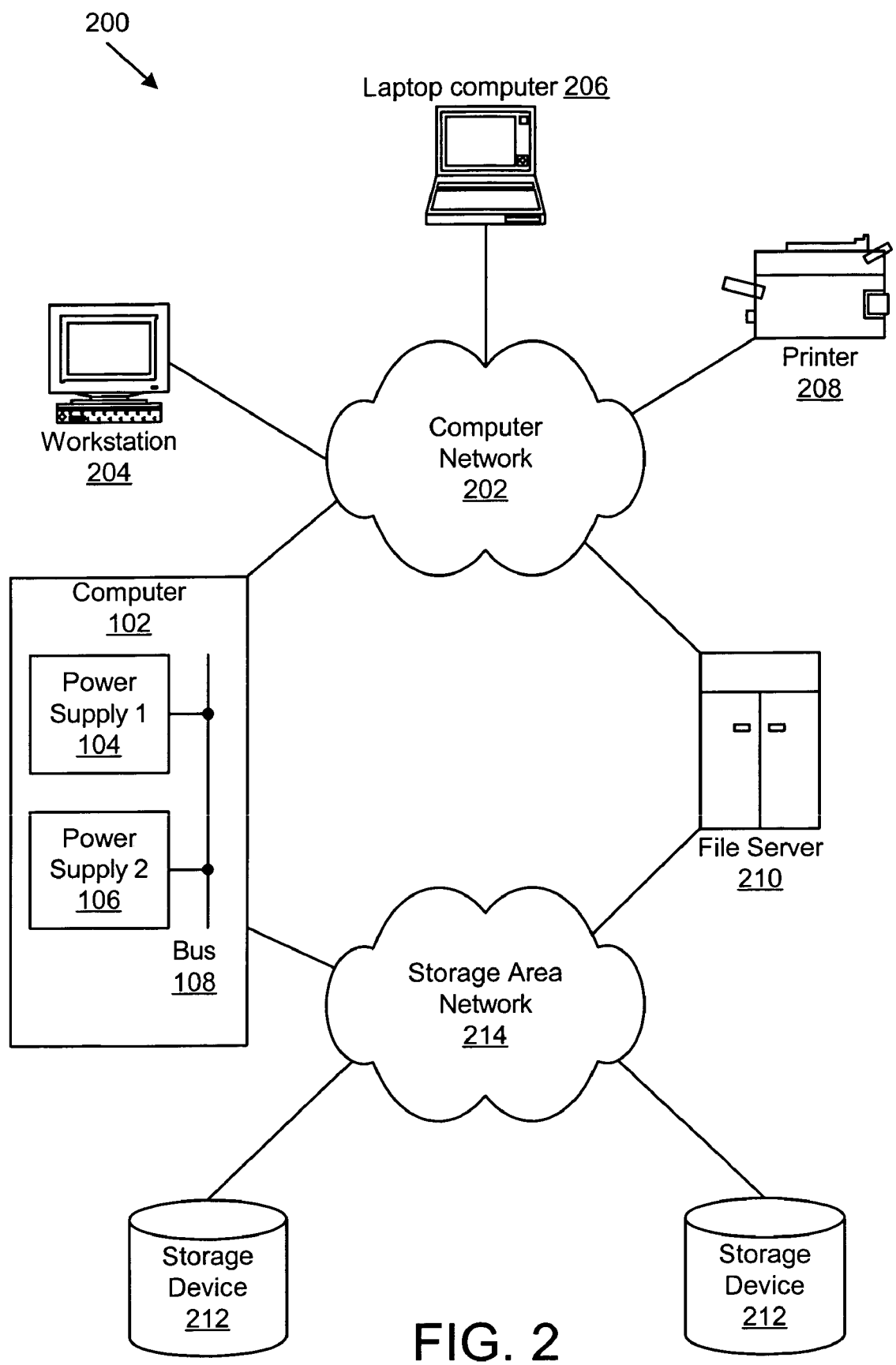
FIG. 2 is a schematic block diagram illustrating one embodiment of a system for maximizing power system holdup time during loss of input power in accordance with the present invention.

FIG. 2 is a schematic block diagram illustrating one embodiment of a system 200 for maximizing power system holdup time during loss of input power in accordance with the present invention. The system 200 includes the computer 102 with two power supplies: power supply 1 104 and power supply 2 106, connected to an internal computer 102 bus 108. The computer 102 may be connected to a computer network 202 which may connect to a workstation 204, a laptop computer 206, or other peripheral devices such as a printer 208. The computer network 202 may also connect to a file server 210. The computer 102 and file server 210 may also connect to storage devices 212 through a storage area network 214. Numerous configurations are possible for the system 200. The system 200 may also only include computer 102. In another embodiment, the system 200 includes an electronic device, such as the storage device 212 with two or more power supplies 104, 106 connected to an internal bus 108. One skilled in the art will recognize other devices with two or more power supplies 104, 106 connected to an internal bus 108 where maximizing power system holdup time during loss of input power may be beneficial.

Figure 3:
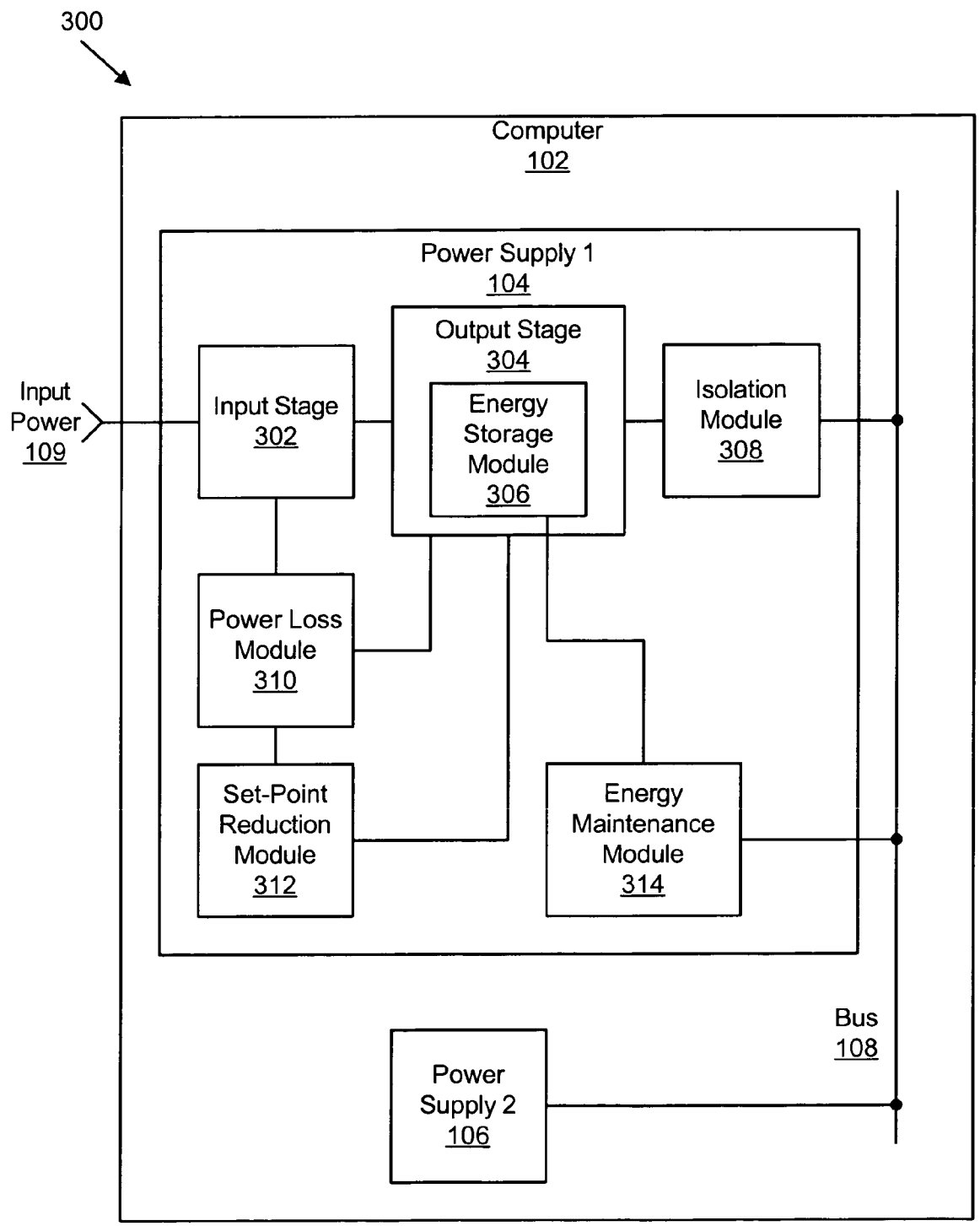
FIG. 3 is a schematic block diagram illustrating one embodiment of an apparatus for maximizing power system holdup time during loss of input power in accordance with the present invention.

FIG. 3 is a schematic block diagram illustrating one embodiment of an apparatus 300 for maximizing power system holdup time during loss of input power in accordance with the present invention. The apparatus 300 includes the computer 102 with power supply 1 104 and power supply 2 106 connected to the bus 108. The bus 108 provides power to components in the computer 102. Power supply 1 104 may have several outputs connected to buses of various voltages. In one embodiment, the bus 108 voltage is 12 VDC, but the voltage may be 5 VDC, 3.3 VDC or any other appropriate voltage or combination of voltages where power supply 1 104 has multiple outputs. The power supply may also include another converter connected to the bus 108 to convert DC voltage to AC voltage.

Power supply 1 104 is connected to the input power 109. Power supply 1 104 is configured with an input stage 302. The input stage 302 may include the AC input terminal 112, an EMI filter 114, a rectifier 116, an inrush current limiter 118, a PFC booster 120, or a PF control 122. The input stage 302 may include any combination of the above mentioned elements depending on input power 109 requirements, EMI requirements, power factor requirements, cost, or other similar factors.

Power supply 1 104 also includes an output stage 304. The output stage 304 includes an energy storage module 306. The energy storage module 306 may be a bulk capacitor 124, a battery, a flywheel, or any other component or combination of components configured to store energy.

The output stage 304 also includes a converter such as the DC-to-DC converter 126 shown in FIG. 1. The DC-to-DC converter 126 may be a buck converter, a boost converter, a buck-boost converter, a Cúk converter, or any other topology configured to convert one voltage at the converter input to another voltage at the converter output. The output stage 304 may include a converter with multiple output stages or multiple converters, where the output stages or converters are configured to deliver power to one or more buses 108. The output stage 304 may also include one or more a feedback loops or other control components for one or more converters or output stages of a converter. The feedback loops are configured to control the output of a converter to a desired voltage. For example, a feedback loop may be configured to control voltage to 12 VDC on the bus 108 while other output stages deliver proportional voltages to buses of other voltages. In an output stage 304 configuration with multiple converters, each converter may have a different feedback loop. One skilled in the art will recognize other configurations of the output stage 304 to convert a voltage at the input of the output stage 304 to one or more voltages on one or more buses 108.

Power supply 1 104 also includes an isolation module 308 between the output stage 304 and the bus 108. In a configuration with multiple buses, each bus may include an isolation module 308 connecting the bus to the output stage 304. The isolation module 308 operates to reduce or stop energy flow from the bus 108 to the output stage 304 when the voltage at the output of the output stage 304 drops below the bus 108 voltage. In a preferred embodiment, the isolation module 308 comprises a MOSFET configured as a diode. When the voltage of the output of the output stage 304 drops below the voltage of the bus 108, the diode configured MOSFET's gate voltage is controlled to turn the MOSFET off or open, thus reducing current to a low level near zero. In another embodiment, the isolation module 308 comprises a power diode 130. In another embodiment, the isolation module comprises a fast-acting switching element. One skilled in the art will recognize other configurations of one or more components configured to prevent energy flow from the bus 108 to the output stage 304 when the output voltage of the output stage 304 drops below the voltage of the bus 108.

The voltage of the output of the output stage 304 may drop an amount and may be above the bus 108 voltage when the isolation module 308 significantly reduces power flow. For example, if the isolation module 308 comprises a diode, the output voltage of the output stage 304 may drop to around 0.3 V above the bus 108 voltage before the diode is sufficiently reverse biased to prevent substantial current flow. The 0.3 V comprises the voltage drop across the diode. One skilled in the art will recognize an appropriate amount of voltage drop across the isolation module 308 to stop or significantly reduce power flow from the bus 108 to the output stage 304.

Power supply 1 104 also includes a power loss module 310 configured to detect loss of power transmitting capability from the input stage 302 of power supply 1 104 to the output stage 304. The power loss module 310 may detect when input power 109 is lost. The power loss module 310 may also detect when the input stage 302 is incapable of providing power to the output stage 304 due to a component failure or other condition preventing power delivery. The power loss module 310 may include the EPOW control 132. One skilled in the art will recognize other configurations of the power loss prevention module 310 to detect loss of power transmitting capability from the input stage 302 to the output stage 304.

Power supply 1 104 also includes a set-point reduction module 312 configured to reduce the output voltage of power supply 1 104 in response to the power loss module 310 detecting loss of power transmitting capability. In a preferred embodiment, the set-point reduction module 312 is configured to reduce the reference voltage of the feedback loop in the output stage 304 to a voltage sufficiently lower than the bus 108 voltage so the isolation module 308 stops or significantly reduces power flow from the bus 108 to the output stage 304. For example, after the power loss detection module 310 detects loss of input power 109, the set-point reduction module 312 may reduce the set-point of the feedback loop to control the output stage 304 output voltage to 11 V where the bus 108 voltage is 12 V. In another embodiment, the set-point reduction module 312 reduces the set-point to a minimum voltage in an allowable bus 108 voltage range. Note that typically the feedback loop adjusts for voltage drop across the isolation module 308 by sensing voltage at the bus 108 rather than at the output of the output stage 304. One skilled in the art will recognize an appropriate amount for the set-point reduction module 312 to reduce the bus voltage set-point.

Once the set-point reduction module 312 reduces the voltage set-point and the isolation module 308 prevents energy transfer from the bus 108 to the output stage 304, the energy in the energy storage module 306 may be stored for use to meet a holdup time requirement. The energy in the energy storage module 306 may be used if power supply 2 106 cannot provide energy for holdup time, for example when power supply 2 106 fails.

In an alternate embodiment, power supply 1 104 includes an energy maintenance module 314 configured to transfer energy from the bus 108 to the energy storage module 306 sufficient to maintain energy in the energy storage module 306 in response to the power loss module 310 detecting loss of power transmitting capability. After the set-point reduction module 312 reduces the bus voltage set-point, energy in the energy storage module 306 may not be at a maximum capacity. For example, time delays in the power loss module 310, in the set-point reduction module 312, and in response time of the output stage 304 and associated feedback loop may allow energy loss in the energy storage module 306. Parasitic leakage of energy in the energy storage module 306 may occur due to parasitic losses in components of power supply 1 104.

The energy maintenance module 314, in a preferred embodiment, transfers energy from the bus 108 to the energy storage module 306 to restore energy in the energy storage module 306 to a maximum level. Typically the energy transfer is at a slow rate because parasitic loss of energy from the energy storage module 306 is typically low. In another embodiment, energy transfer may be at a higher rate where it is desirable to restore energy in the energy storage module 306 quickly to increase reliability.

Transfer of energy from the bus 108 to the energy storage device 306 may require a boost circuit to enable power transfer from the lower bus 108 voltage to the higher voltage of the energy storage device 306. In an alternate embodiment, the energy maintenance module 314 is configured to transfer energy from power supply 2 106 to the energy storage module 306 sufficient to maintain energy in the energy storage module 306 in response to the power loss module 310 detecting loss of power transmitting capability. The alternate embodiment may not require a boost circuit or may require a boost circuit with a lower boost ratio. Boost circuits are well known in the art.

Figure 4:
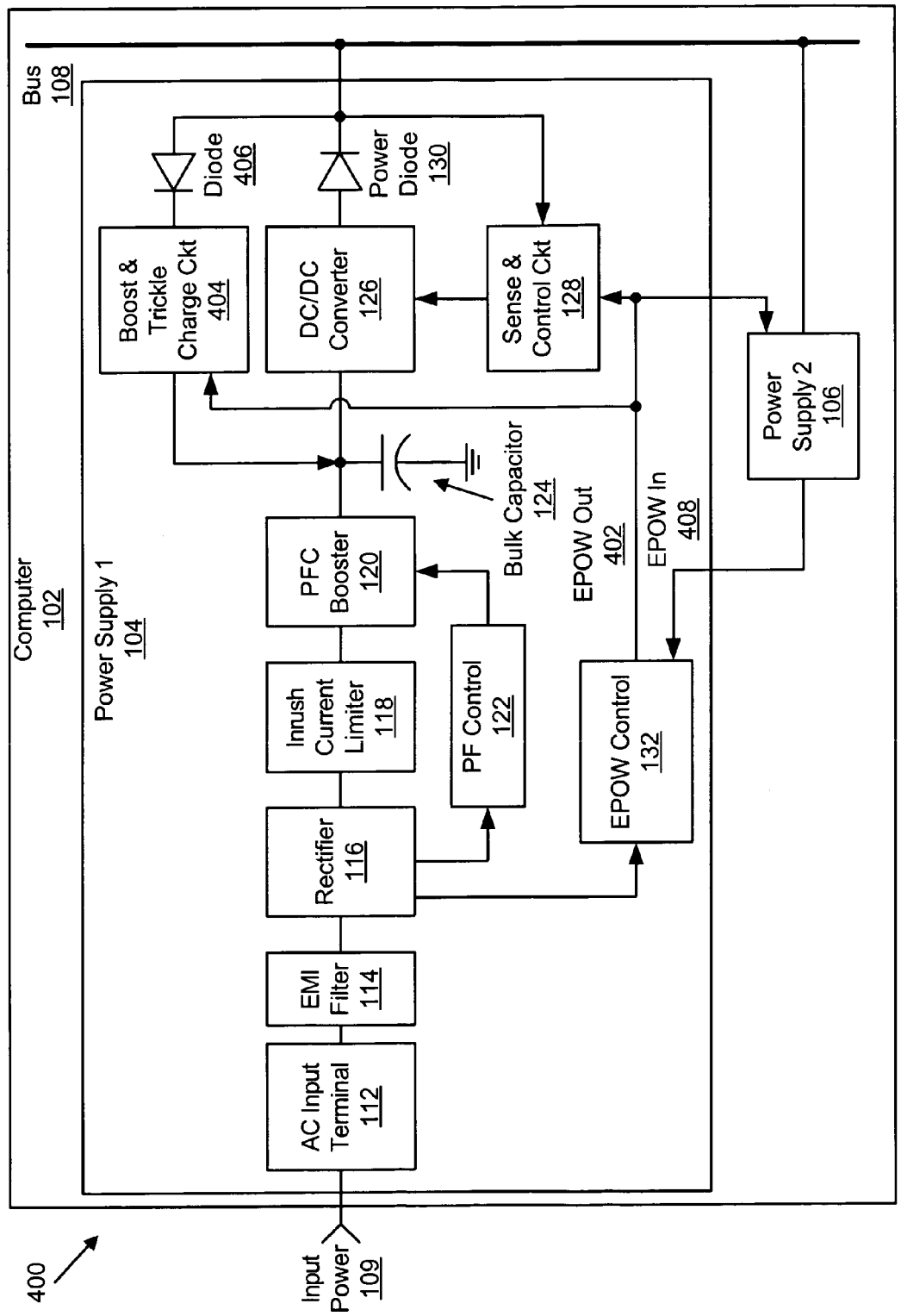
FIG. 4 is a schematic block diagram illustrating an example of an apparatus for maximizing power system holdup time during loss of input power in accordance with the present invention.

FIG. 4 is a schematic block diagram illustrating an example 400 of an apparatus 300 for maximizing power system holdup time during loss of input power 109 in accordance with the present invention. The example apparatus 400 includes the computer 102 with power supply 1 104 and power supply 2 106 connected to the bus 108.

Power supply 1 104 includes input power 109 applied to an input stage 302 comprising the AC input terminal 112, an EMI filter 114, a rectifier 116, an inrush current limiter 118, a PFC booster 120, and a PF control 122. Power supply 1 104 includes an output stage 304 comprising a bulk storage capacitor 124 and a DC-to-DC converter 126. Power supply 1 104 includes a set-point reduction module 312 comprising a sense and control circuit 128. Power supply 1 104 includes an isolation module 308 in the form of a power diode 130. Preferably, the power diode 130 is a MOSFET configured as a diode.

Power supply 1 104 includes a power loss module 310 in the form of an EPOW control 132. In the present embodiment, the EPOW control 132 sends an EPOW out 402 signal in response to loss of power transmitting capability in the input stage 302.

In one embodiment, the EPOW control 132 sends the EPOW out 402 signal in response to loss of power to the rectifier 116. The EPOW out 402 signal is provided at least to the sense and control circuit 128. In response, the sense and control circuit 128 reduces a reference voltage or set-point voltage of the bus 108. Reduction of the set-point causes the DC-to-DC converter 126 to reduce the voltage at the output of the DC-to-DC converter 126 and causes the power diode 130 to be reverse biased. When the power diode 130 is reverse biased, a duty cycle of the DC-to-DC converter 126 goes to zero or the DC-to-DC converter 126 is otherwise shutdown in response to the feedback loop in the sense & control circuit 128 trying to reduce the bus 108 voltage. Power flow from the bulk capacitor 124 to the DC-to-DC converter 126 is substantially reduced to zero or close to zero, thus preserving energy in the bulk capacitor 124. The energy is preserved to meet a holdup time requirement during a condition when the bus 108 voltage drops due to a failure or loss of power in power supply 2 106.

Power supply 1 104 and power supply 2 106 may include a current sharing circuit configured to allocate current sharing to the bus 108 during normal operation. Typically, current sharing circuits adjust the voltage set-points of each power supply being controlled to maintain current sharing. In an alternate embodiment, the current sharing circuit is configured to reduce current from power supply 1 104 to the bus 108 substantially to zero in response to the power loss module detecting loss of power transmitting capability from the input stage 302 to the output stage 304. The current sharing circuit may include an override circuit to override a minimum current limit of power supply 1 104 if the minimum limit is not set to zero.

In one embodiment, power supply 1 104 includes an energy maintenance module 314 in the form of a boost and trickle charge circuit 404 and a diode 406. The boost and trickle charge circuit 404 is configured to charge the bulk capacitor 124 in response to the EPOW out 402 signal. Because the bus 108 voltage is typically lower than the bulk capacitor 124 voltage, the boost and trickle charge circuit 404 includes a boost circuit. The diode 406 is included to limit the energy transferred to the bulk capacitor 124. The boost circuit is configured so that when the bulk capacitor 124 is charged, the diode 406 becomes reverse biased and energy stops flowing to the bulk capacitor 124. In another embodiment, the diode 406 could be replaced by a switch configured to open when the bulk capacitor 124 is charged. One skilled in the art will recognize other ways to limit energy flowing to the bulk capacitor 124.

EPOW control 132 also sends the EPOW out 402 signal to power supply 2 106 as well as to the computer 102. Similarly, power supply 2 106 may include an EPOW control circuit and may send an EPOW signal to the computer 102 and to the EPOW control 132 in power supply 1 104. The signal from the EPOW control circuit in power supply 2 106 to EPOW control 132 in power supply 1 104 is shown as EPOW in 408.

Figure 5:
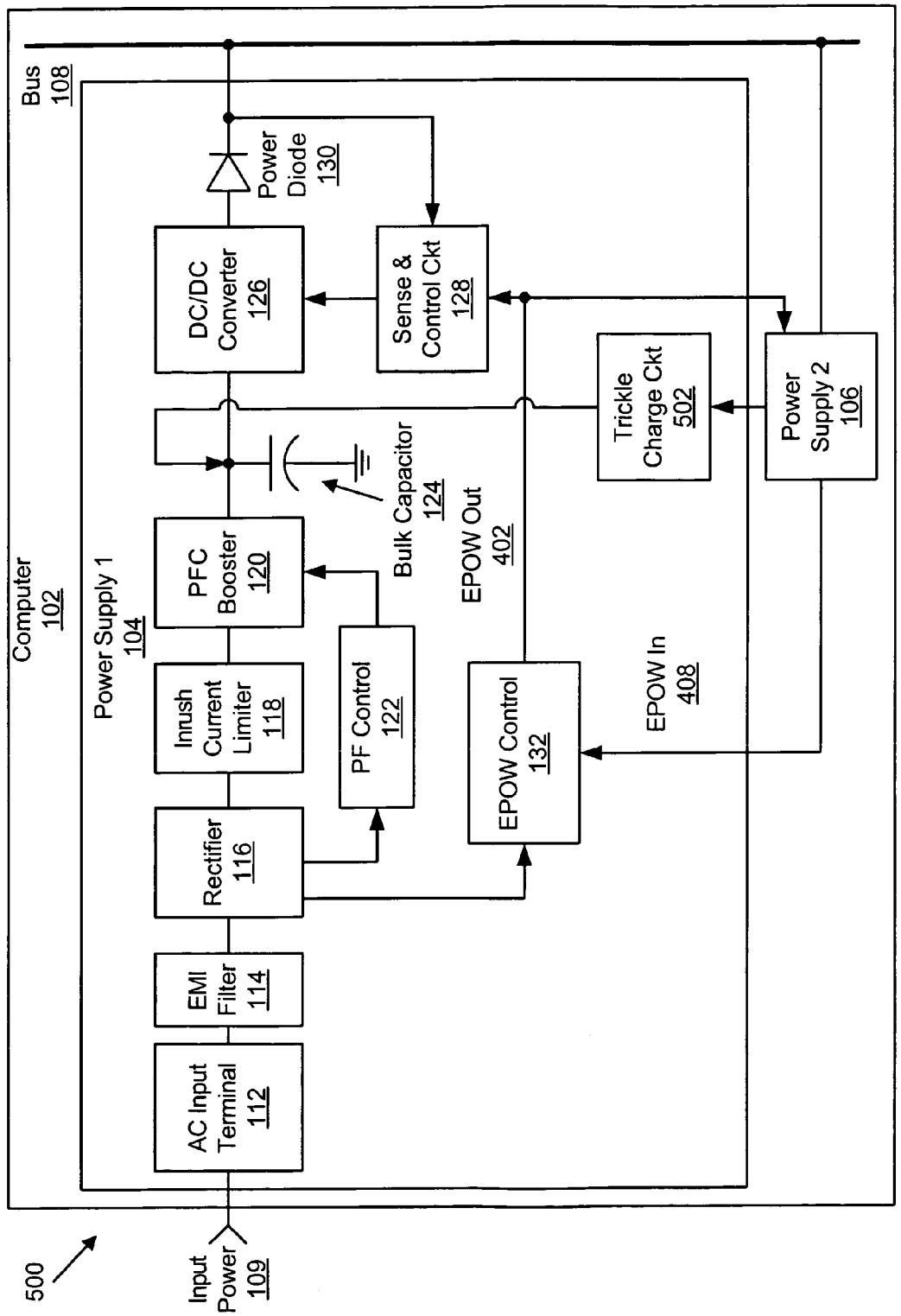
FIG. 5 is a schematic block diagram illustrating another embodiment of an example of an apparatus for maximizing power system holdup time during loss of input power in accordance with the present invention.

FIG. 5 is a schematic block diagram illustrating another embodiment of an example 500 of an apparatus 300 for maximizing power system holdup time during loss of input power in accordance with the present invention. The example apparatus 500 includes substantially all of the elements shown in the example 400 in FIG. 4 with the exception that the boost and trickle charge circuit 404 and associated diode 406 are not included, but a trickle charge circuit 502 is included.

The trickle charge circuit 502 operates to charge the bulk capacitor 124, but instead of drawing power from the bus 108, the trickle charge circuit 502 draws power from power supply 2 106. The trickle charge circuit 502 draws power from a location in power supply 2 106 with voltage higher than or near the voltage of the bulk capacitor 124 in power supply 1 104. If the voltage fed to the trickle charge circuit 502 is higher than the bulk capacitor 124 being charged, a boost circuit may not be required. If the voltage fed to the trickle charge circuit 502 is near the voltage of the bulk capacitor 124 being charged, a boost circuit may be required, but the amount that the voltage is boosted is small in comparison to the amount the voltage is boosted in the boost and trickle charge circuit 404 of FIG. 4.

The trickle charge circuit 502 also includes a diode, switch, or other element to limit the charge in the bulk capacitor 124 in power supply 1 104. The trickle charge circuit 502 also operates in response to receiving the EPOW out 402 signal sent when the input power 109 is lost or a component fails so power is not input to the bulk capacitor 124.

The examples 400, 500 shown in FIGS. 4 and 5 are two examples of maximizing power supply holdup time during loss of input power. Other embodiments are possible that substantially carry out the steps and functions described herein. Other power supply configurations are possible and may depend upon input power requirements, bus voltage requirements, number of redundant power supplies feeding a bus, EMI requirements, power factor requirements, and the like. One skilled in the art will recognize other power supply configurations where maximizing holdup time during loss of input power is beneficial.

Figure 6:
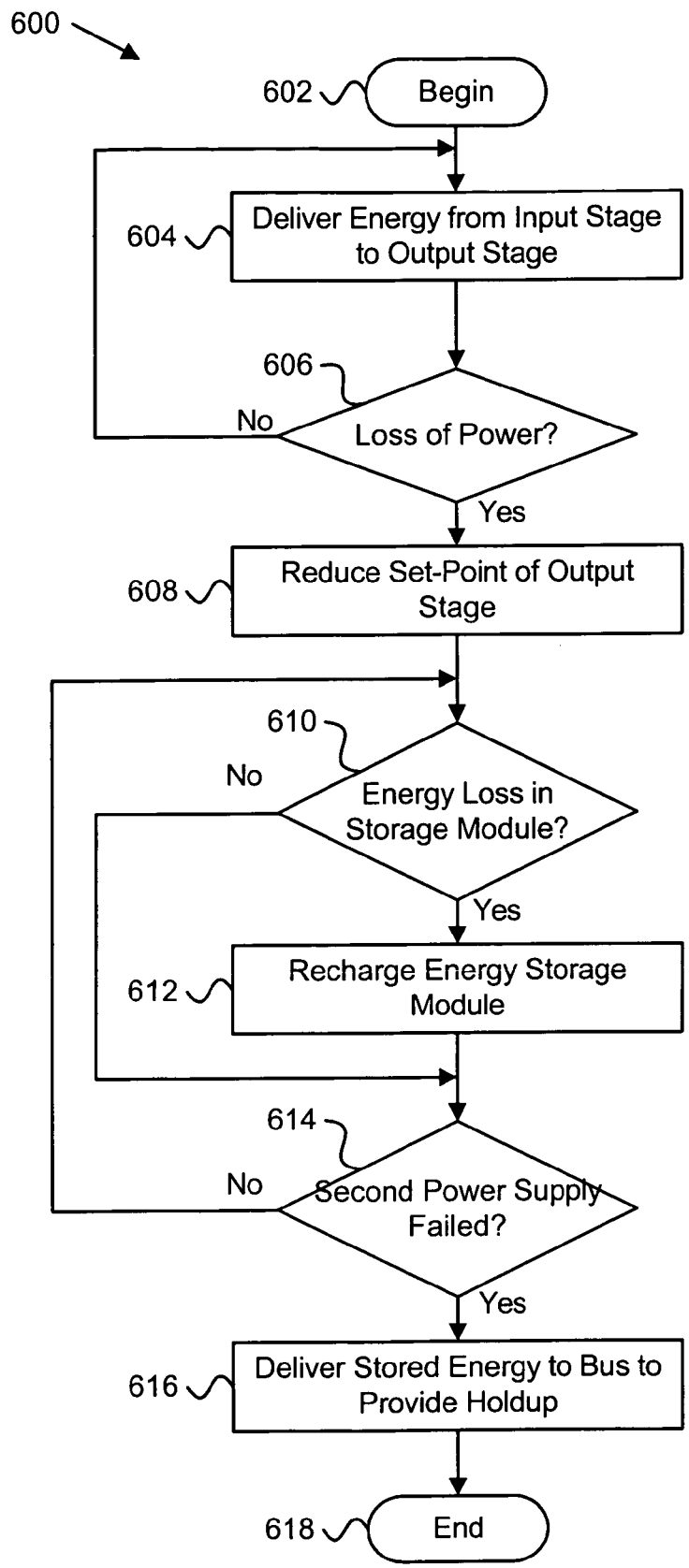
FIG. 6 is a schematic flow chart diagram illustrating one embodiment of a method for maximizing power system holdup time during loss of input power in accordance with the present invention.

FIG. 6 is a schematic flow chart diagram illustrating one embodiment of a method 600 for maximizing power system holdup time during loss of input power in accordance with the present invention. The method 600 begins 602 when the input stage 302 delivers 604 power to the output stage 304 during normal operation of power supply 1 104. The power loss module 310 detects 606 loss of power transmitting capability from the input stage 302 to the output stage 304. If the power loss module 310 does not detect 606 loss of power transmitting capability, the input stage 302 continues to deliver 604 power to the output stage 304. If the power loss module 310 detects 606 loss of power transmitting capability from the input stage 302 to the output stage 304 either through loss of input power 109 or failure of a component, the set-point reduction module 312 reduces 608 the set-point or reference voltage of the output stage 304. The output stage 304 then reduces the output voltage of the DC-to-DC converter 126 and the isolation module 308 prevents energy from flowing from the bus 108 to the energy storage module 306.

The energy maintenance module 314 detects 610 energy loss in the energy storage module 306. If the energy maintenance module 314 does not detect 610 energy loss in the energy storage module 306, the energy maintenance module 314 continues to monitor the energy storage module 306. If the energy maintenance module 314 detects 610 energy loss in the energy storage module 306, the energy maintenance module 314 recharges 612 the energy storage module 306.

If power supply 2 106 does not fail 614, the energy maintenance module 314 continues to detect 610 energy loss in the energy storage module 306. If power supply 2 106 fails 614 to provide power to the bus 108, the bus 108 voltage drops. Once the bus 108 voltage drops, the isolation module 308 no longer limits energy flow between the bus 108 and the output stage 304. Typically, if the isolation module 308 is configured as a power diode 130, the power diode 130 becomes forward biased and allows current to flow from the output stage 304 to the bus 108. The output stage 304 then delivers 616 energy stored in the energy storage module 306 to the bus 108. The energy delivered to the bus 108 from the energy storage module 306 provides holdup time to the computer 102. The holdup energy may not be supplied by power supply 2 106 due to a failure of power supply 2 106.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to maximize power system holdup time during loss of input power, the apparatus comprising:
    an energy storage module configured to deliver energy to an output stage of a first power supply, the output stage delivering energy to a bus;
    a power loss module configured to detect loss of power transmitting capability from an input stage of the first power supply to the output stage of the first power supply;
    a set-point reduction module configured to reduce an output voltage of the first power supply in response to the power loss module detecting loss of power transmitting capability, wherein reducing the output voltage of the first power supply comprises changing a set point of the first power supply, the set point used by the first power supply to maintain the output voltage of the first power supply at a level proportionate to the set point; and
    an isolation module configured to prevent energy flow from the energy storage module to the bus when the output voltage of the first power supply is lower than a voltage on the bus sustained by a second power supply.

2. The apparatus of claim 1, further comprising an energy maintenance module configured to transfer energy from the bus to the energy storage module sufficient to maintain energy in the energy storage module in response to the power loss module detecting loss of power transmitting capability.

3. The apparatus of claim 1, further comprising an energy maintenance module configured to transfer energy from the second power supply to the energy storage module sufficient to maintain energy in the energy storage module in response to the power loss module detecting loss of power transmitting capability.

4. The apparatus of claim 1, wherein the power loss module detects loss of input power to the input stage of the first power supply.

5. The apparatus of claim 1, wherein the power loss module detects a component failure in the first power supply causing loss of power transmitting capability from the input stage to the output stage.

6. The apparatus of claim 1, wherein the energy storage module comprises a capacitor.

7. The apparatus of claim 1, wherein the isolation module comprises an electronic device configured as a diode.

8. The apparatus of claim 7, wherein the electronic device comprises a MOSFET.

9. The apparatus of claim 1, wherein the set-point reduction module comprises a current sharing circuit configured to control current sharing between the first power supply and the second power supply.

10. A system to maximize power system holdup time during loss of input power, the system comprising:
    a bus;
    a first power supply connected to the bus comprising
        an energy storage module configured to deliver energy to an output stage of a first power supply, the output stage delivering energy to a bus;
        a power loss module configured to detect loss of power transmitting capability from an input stage of the first power supply to the output stage of the first power supply;
        a set-point reduction module configured to reduce an output voltage of the first power supply in response to the power loss module detecting loss of power transmitting capability, wherein reducing the output voltage of the first power supply comprises changing a set point of the first power supply, the set point used by the first power supply to maintain the output voltage of the first power supply at a level proportionate to the set point; and
        an isolation module configured to prevent energy flow from the energy storage module to the bus when the output voltage of the first power supply is lower than a voltage on the bus sustained by a second power supply; and
    a second power supply connected to the bus configured to sustain the voltage on the bus when the isolation module prevents energy flow from the energy storage module to the bus.

11. The system of claim 10, further comprising an energy maintenance module configured to transfer energy from the bus to the energy storage module sufficient to maintain energy in the energy storage module in response to the power loss module detecting loss of power transmitting capability.

12. The system of claim 10, further comprising an energy maintenance module configured to transfer energy from the second power supply to the energy storage module sufficient to maintain energy in the energy storage module in response to the power loss module detecting loss of power transmitting capability.

13. The system of claim 10, wherein the energy storage module comprises a capacitor.

14. The system of claim 10, wherein the isolation module comprises an electronic device configured as a diode.

15. The system of claim 14, wherein the electronic device comprises a MOSFET.

16. An apparatus to maximize power system holdup time during loss of input power, the apparatus comprising:
   means for delivering energy to an output stage of a first power supply, the output stage delivering energy to a bus;
   means for detecting loss of power transmitting capability from an input stage of the first power supply to the output stage of the first power supply;
   means for reducing an output voltage of the first power supply in response to detecting loss of power transmitting capability, wherein reducing the output voltage of the first power supply comprises changing a set point of the first power supply, the set point used by the first power supply to maintain the output voltage of the first power supply at a level proportionate to the set point; and
   means for preventing energy flow from the output stage of the first power supply to the bus when the output voltage of the first power supply is lower than a voltage on the bus sustained by a second power supply.

17. The apparatus of claim 16 further comprising means for transferring energy from the bus to the first power supply sufficient to maintain energy in the first power supply in response to detecting loss of power transmitting capability.

18. The apparatus of claim 16, further comprising means for transferring energy from the second power supply to the first power supply sufficient to maintain energy in the first power supply in response to detecting loss of power transmitting capability.

19. The apparatus of claim 16, wherein means for detecting loss of power transmitting capability further comprises means for detecting loss of input power to the input stage of the first power supply.

20. The apparatus of claim 16, wherein means for detecting loss of power transmitting capability further comprises means for detecting a component failure in the first power supply that causes loss of power transmitting capability from the input stage to the output stage.

* * * * *